United States Patent [19]
Ashikaga et al.

[11] Patent Number: 4,967,135
[45] Date of Patent: Oct. 30, 1990

[54] INDUCTION MOTOR VECTOR CONTROL

[75] Inventors: Tadashi Ashikaga, Tokyo; Masakatsu Nomura, Kanagawa, both of Japan

[73] Assignee: Kabushiki Kaisha Meidensha, Tokyo, Japan

[21] Appl. No.: 314,042

[22] Filed: Feb. 22, 1989

[51] Int. Cl.$^5$ ............................................. H02P 5/40
[52] U.S. Cl. .................................. 318/808; 318/798; 318/805
[58] Field of Search .......................... 318/798–802, 318/803, 805–810, 767, 766, 812

[56] References Cited

U.S. PATENT DOCUMENTS

| | | | |
|---|---|---|---|
| 4,484,128 | 11/1984 | Jo Hen et al. | 318/805 |
| 4,509,003 | 4/1985 | Ohnishi et al. | 318/808 |
| 4,510,430 | 4/1985 | Ashikaga et al. | 318/808 |
| 4,593,240 | 6/1986 | Blaschke | 324/158 MG |
| 4,629,961 | 12/1986 | Blaschke | 324/158 MG |
| 4,724,373 | 2/1988 | Lipo | 318/805 |
| 4,751,447 | 6/1988 | Okachi | 318/772 |
| 4,757,248 | 7/1988 | Fujioka et al. | 318/806 |
| 4,792,741 | 12/1988 | Matsuo et al. | 318/805 |
| 4,808,903 | 2/1989 | Matsui et al. | 318/808 |

FOREIGN PATENT DOCUMENTS 3221906 12/1983 Fed. Rep. of Germany .
3637144 5/1987 Fed. Rep. of Germany .

Primary Examiner—William M. Shoop, Jr.
Assistant Examiner—David Martin
Attorney, Agent, or Firm—Bachman & LaPointe

[57] ABSTRACT

A method and apparatus for vector control of an induction motor. A slip frequency is calculated based on a desired motor torque, a desired motor flux and a motor secondary time constant. An actual value for induction motor angular velocity is estimated as a function of primary current and voltage applied to drive the induction motor. The calculated slip frequency is added to the estimated angular velocity to calculate an angular frequency. The calculated angular frequency is used along with the desired motor torque and the desired motor flux to vary the primary current and voltage so as to drive the induction motor with no $\beta$-axis secondary flux.

12 Claims, 4 Drawing Sheets

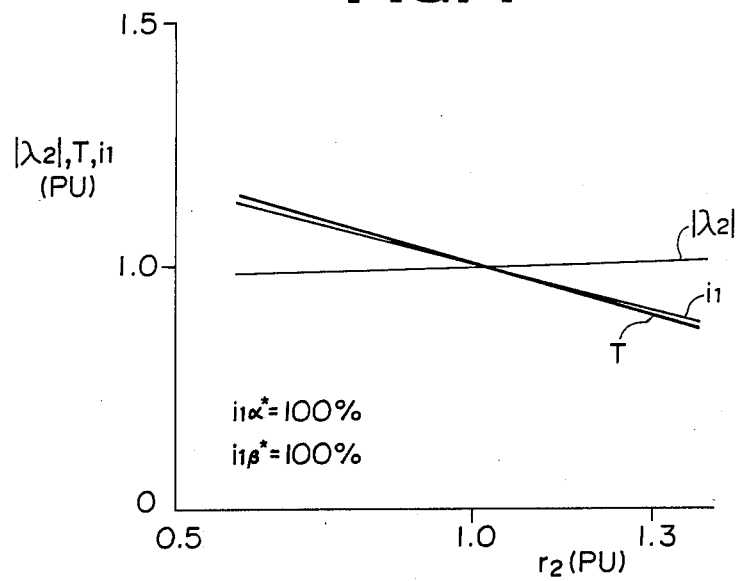
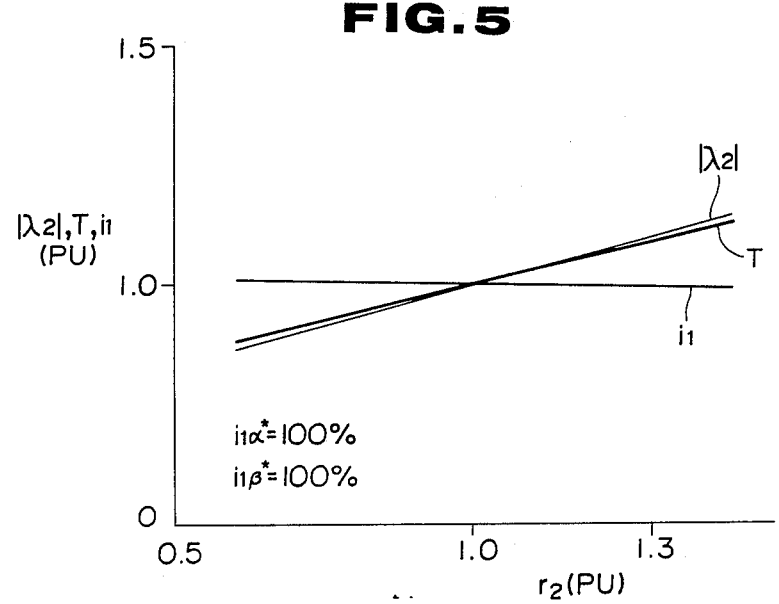

INDUCTION MOTOR VECTOR CONTROL

BACKGROUND OF THE INVENTION

This invention relates to a method and apparatus for controlling an adjustable speed electric motor and, more particularly, to a method and apparatus for vector control of an induction motor.

Electric power converters or inverters have been employed for the application of adjustable speed drives using alternating current motors. A typical converter includes a direct current (DC) rectifier for rectifying three-phase AC input voltage and for supplying the resulting direct current (DC) bus potential to an inverter. The inverter comprises a plurality of pairs of series-connected switching elements to generate an adjustable frequency output. In many applications, a frequency adjustment is effected through a control circuit which employs a pulse width modulation (PWM) control technique in producing variable frequency gating pulses to periodically switch the respective switching elements so as to operate the motor at a variable speed. The motor can be propelled (motoring mode) or retarded (braking mode) as desired by appropriately varying the frequency and the amplitude of the excitation that the inverter applies to the motor.

The actual motor speed is sensed and compared with a commanded motor speed. A speed error signal, which depends on the difference between the actual and desired values of motor speed, is derived and applied to a proportional-plus-integral control circuit which converts it into a torque command signal. The control circuit responds to the torque command signal by controlling the operation of the inverter so as to vary, as a function of the torque command signal, the amplitude of the voltages supplied from the inverter to the motor.

In order to provide more accurate motor control and linear motor torque control for variations in commanded torque, vector control has been proposed and employed. Such vector control utilizes a secondary flux rotational speed together with the torque command signal to control the momentary values of the frequency and amplitude of the stator current of the motor. It is current practice to calculate the secondary flux rotational speed by adding the sensed motor actual speed to a slip frequency calculated as a function of the torque command signal.

Accordingly, the conventional vector control requires a speed sensor positioned near the motor to sense motor rotational frequency. In addition, since the inverter control circuit is normally located at a long distance from the motor, a long code is required to connect the speed sensor to the inverter control circuit. Thus, the conventional vector control is subject to induction interference from motor currents or the like.

SUMMARY OF THE INVENTION

Therefore, a main object of the invention is to provide an improved vector control method and apparatus which can provide more accurate motor control without sensing motor rotational frequency.

There is provided, in accordance with the invention, a method for vector control of an adjustable-speed induction motor having a secondary time constant, and including means for applying a primary current and voltage to drive the induction motor. The method comprises the steps of setting a desired motor torque, setting a desired motor flux, calculating a slip frequency based on the desired motor torque, the desired motor flux, and the secondary time constant, estimating a value for induction motor angular velocity as a function of the primary current and voltage, summing the calculated slip frequency to the estimated angular velocity to calculate an angular frequency, and controlling the motor driving means based on the desired motor torque, the desired motor flux, and the calculated angular frequency to vary the primary current and voltage so as to drive the induction motor with no $\beta$-axis secondary flux.

In another aspect of the invention, there is provided an apparatus for vector control of an adjustable-speed induction motor having a secondary time constant, and including means for applying a primary current and voltage to drive the induction motor. The apparatus comprises a first source for producing a torque command signal indicative of a desired motor torque, a second source for producing a flux command signal indicative of a desired motor flux, means for calculating a slip frequency based on the torque command signal, the flux command signal, and the secondary time constant to produce a slip frequency signal indicative of the calculating slip frequency, means for estimating a value for induction motor angular velocity as a function of the primary current and voltage to produce an estimated speed signal indicative of the estimated motor angular velocity, means for summing the slip frequency signal to the estimated speed signal to provide an angular frequency signal, and a control circuit responsive to the torque command signal, the flux command signal, and the angular frequency signal for controlling the motor driving means to vary the primary current and voltages so as to drive the induction motor with no $\beta$-axis secondary flux.

BRIEF DESCRIPTION OF THE DRAWINGS

The invention together with its further objects and advantages thereof, may be best understood, by reference to the following description taken in conjunction with the accompanying drawings, in which like reference numerals identify like components in the several figures and in which:

FIG. 4 contains three graphs showing motor characteristics provided under the CCS type vector control;

FIG. 5 contains three graphs showing motor characteristics provided under the CVS type vector control.

DETAILED DESCRIPTION OF THE INVENTION

Figure 1:
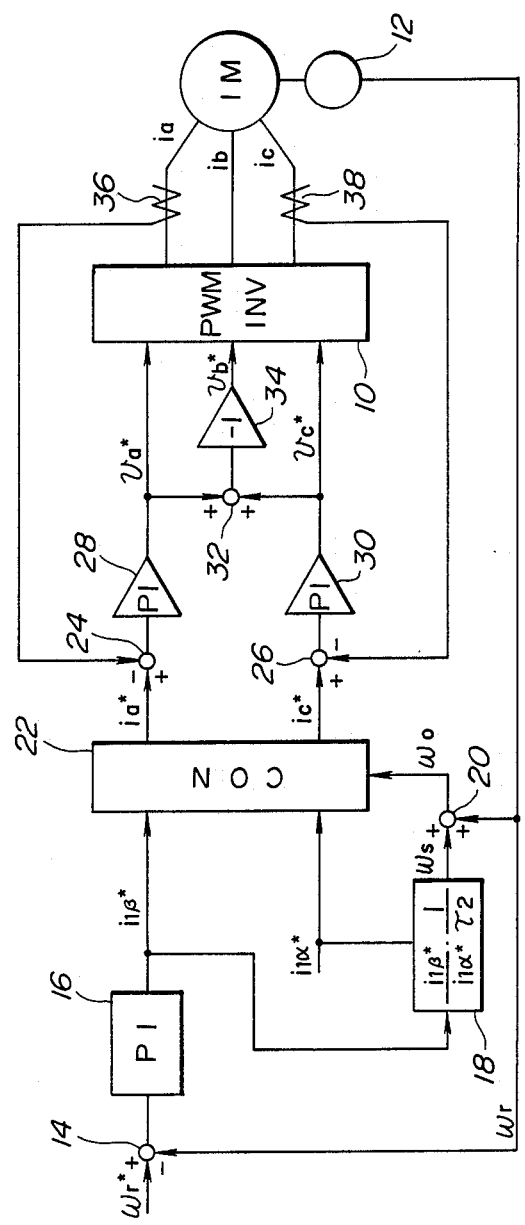
FIG. 1 is a schematic block diagram showing a prior art control-current-source (SSC) type vector control apparatus.
Figure 2:
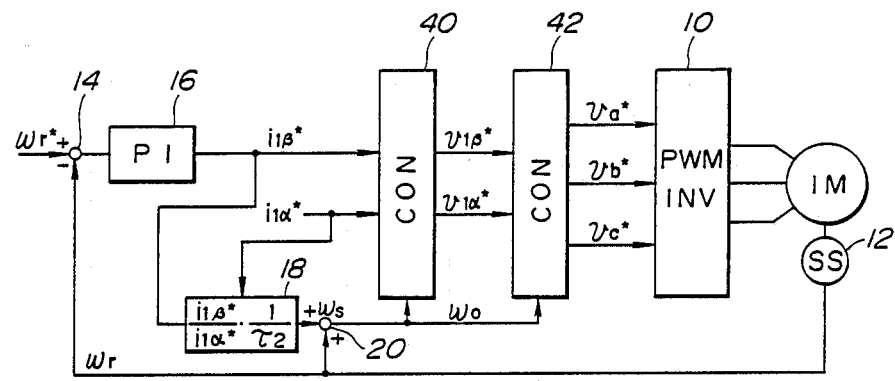
FIG. 2 is a schematic block diagram showing a prior art control-voltage-source (CVS) type vector control apparatus.

Prior to the description of the preferred embodiment of the present invention, the prior art vector control apparatus of FIGS. 1 and 2 are briefly described.

The vector control apparatus are arranged to control exitation currents ia, ib and ic that a PWM/INV unit 10 applies to an induction motor IM by utilizing motor-flux and motor-torque command current signals i1α* and i1β* expressed in a coordinate system rotating in synchronism with the rotor of the motor IM. The PWM/INV unit 10 should be considered as including a pulse-width-modulation (PWM) waveform generator, a triangle waveform generator, a gating circuit, and an inverter. The inverter includes a plurality of parallel pairs of series-connected switching elements arranged and controlled to convert DC input power into AC output power having adjustable frequency and voltage magnitude. The PWM wave form generator receives a triangle wave signal from the triangle wave generator and controls the gating circuit to produce gating pulses so as to periodically switch the respective switching elements of the inverter in a predetermined sequence and at a desired frequency. The AC output is supplied to the three-phase induction motor IM through three output conductors. The induction motor IM has three-phase stator windings which are energized by the output of the inverter and a rotor coupled to drive a mechanical load.

FIG. 1 shows a vector control apparatus of the control-current-source (CCS) type which converts the motor-flux and motor-torque command current signals i1α* and i1β* to three-phase excitation current comand signals ia*, ib* and ic* and utilizes excitation current feedback signals to ensure that the excitation currents ia, ib and ic are correct to coincide with the respective excitation current command signals ia*, ib* and ic*. FIG. 2 shows a vector control apparatus of the control-voltage-source (CVS) type which calculates values for excitation voltage command signals va*, vb* and vc* as a function of the motor-flux and motor-torque command current signals i1α* and i1β* and utilizes the calculated values to produce excitation currents ia, ib and ic as required by the motor-flux and motor-torque command current signals i1α* and i1β*.

Referring to FIG. 1, the conventional CCS type vector control apparatus includes a speed sensor 12, such as a tachometer generator, for sensing the actual angular velocity of the rotor of the motor IM. The speed sensor 12 produces an actual speed signal wr indicative of the sensed value of the angular velocity of the rotor of the motor IM. The actual speed signal wr is applied to a subtractor 14 having another input from a current source which produces a speed command signal wr* indicative of a required value for motor speed. The subtractor 14 subtracts the actual speed signal wr from the speed command signal wr* to provide a speed error signal indicative of the difference between the actual-speed and speed-command signals wr and wr*. The speed error signal is fed from the subtractor 14 to a proportional-plus-integral control circuit 16 which converts it into a motor-torque command current signal i1β* indicative of a required value for motor torque expressed in the rotating coordinate system. The motor-torque command current signal i1β2 * is fed to a slip calauation circuit 18 having another input from a current source which produces a motor-flux command current signal i1α* indicative of a required value for motor flux expressed in the rotating coordinate system.

The slip calculation circuit 18 calculates a value ws for slip frequency as ws=i1β*/(i1α*×t2, where t2 is a secondary time constant. The slip calculation circuit 18 produces a slip frequency signal ws indicative of the calculated slip frequency value. The slip frequency signal ws is fed to a summing circuit 20 which adds it to the actual speed signal wr fed thereto from the speed sensor 12 and produces an angular frequency signal wo indicative of a primary angular frequency. The angular frequency signal wo is applied to a coordinate converter 22 which also receives the motor-torque command current signal i1β* and the motor-flux command current signal i1α*. The coordinate converter 22 utilizes the angular frequency signal wo for converting the motor-flux and motor-torque command current signals i1α* and i1β* to two-phase exitation current command signals ia* and ic*.

The excitation current command signal ia* is applied to a subtractor 24 having another input from a current transformer 36. The current transformer 36 is coupled to one of the output conductors for providing an excitation current feedback signal. The subtractor 24 subtracts the excitation current feedback signal from the excitation current command signal ia* to produce an error signal. This error signal is applied to the PWM/INV unit 10 through a proportional-plus-integral control circuit 28 which converts the error signal into an excitation voltage command signal va*. Similarly, the excitation current command signal ic* is applied to a subtractor 26 having another input from a current transformer 38. The current transformer 38 is coupled to another output conductor for providing an excitation current feedback signal. The subtractor 26 subtracts the excitation current feedback signal from the excitation current command signal ic* to produce an error signal. This error signal is applied to the PWM/INV unit 10 through a proportional-plus-integral control circuit 30 which converts the error signal into an excitation voltage command signal vc*. The excitation voltage command signals va* and vc* are also applied to a summing circuit 32 which adds them and produces an added signal. This added signal is applied to an inverting amplifier 34 which inverts the input signal into an excitation voltage command signal vb*. The excitation voltage command signal vb* is applied to the PWM/INV unit 10. The PWM/INV unit 10, which receives the excitation voltage command signals va*, vb* and vc*, varies the power to the induction motor IM. The excitation current feedback signals are used to ensure the excitation currents ia, ib and ic are correct to coincide with the respective excitation current command signals ia*, ib* and ic* so as to maintain a 90° phase difference between the motor-flux and motor-torque command current signals i1α* and i1β*.

Referring to FIG. 2, the conventional CVS type vector control apparatus includes a speed sensor 12, such as a tachometer generator, for sensing the actual angular velocity of the rotor of the motor IM. The speed sensor 12 produces an actual speed signal wr indicative of the sensed value of the angular velocity of the rotor of the motor IM. The actual speed signal wr is applied to a subtractor 14 having another input from a current source which produces a speed command signal wr* indicative of a required value for motor speed. The subtractor 14 subtracts the actual speed signal wr from the speed command signal wr* to provide a speed error signal indicative of the difference between the actual-speed and speed-command signals wr and wr*. The speed error signal is fed from the subtractor 14 to a proportional-plus-integral control circuit 16 which converts the speed error signal to a motor-torque command current signal i1β* indicative of a required value for motor torque expressed in the rotating coordinate system. The motor-torque command current signal i1β* is fed to a slip calculation circuit 18 having another input from a current source which produces a motor-flux command current signal $i1\alpha^*$ indicative of a required value for motor flux expressed in the rotating coordinate system.

The slip calculation circuit 18 calculates a value ws for slip frequency as $ws = i1\beta^*/(i1\alpha^* \times t2)$, where t2 is a secondary time constant. The slip calculation circuit 18 produces a slip frequency signal ws indicative of the calculated slip frequency value. The slip frequency signal ws is fed to a summing circuit 20 which adds it to the actual speed signal wr fed thereto from the speed sensor 12 and produces an angular frequency signal wo indicative of a primary angular frequency. The angular frequency signal wo is applied to a non-interference calculation circuit 40 and also to a coordinate converter 42.

The non-interference calculation circuit 40 converts the motor-flux and motor-torque command current signals $i1\alpha^*$ and $i1\beta^*$ to motor-flux and motor-torque command voltage signals $v1\alpha^*$ and $v1\beta^*$ by calculating required values for the motor-flux and motor-torque command voltage signals $v1\alpha^*$ and $v1\beta^*$ as:

$$v1\alpha^* = r1 \times i1\alpha^* + wo \times L\sigma \times i1\beta^* \quad (1)$$

$$v1\beta^* = (r1 + L\sigma P) \times i1\beta^* - wo \times L1 \times i1\alpha^* \quad (2)$$

where r1 is the primary resistance, $L\sigma$ is the equivalent leakage inductance, L1 is the primary inductance, P is the differentiating operator (d/dt). Since the value of $L\sigma/r1$ is very small, $1/(r1 + L\sigma P)$ may be approximated as $1/r1$. Thus, Equation (2) can be simplified as:

$$v1\beta^* = r1 \times i1\beta^* - wo \times L1 \times i1\alpha^* \quad (3)$$

Figure 3:
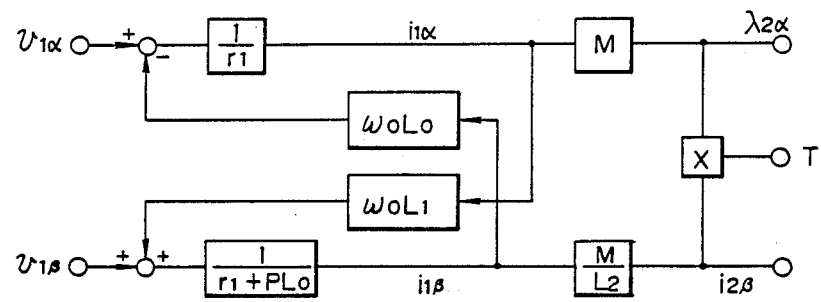
FIG. 3 is a diagram showing an equivalent electric circuit of the induction motor.

These Equations can be obtained by a study of the diagram of FIG. 3 which shows an equivalent circuit of the induction motor IM operating under the vector (or non-interference) control of the motor drive circuit. It is to be noted that the non-interference calculation circuit 40 calculates the required values for the motor-flux and motor-torque command voltage signals $v1\alpha^*$ and $v1\beta^*$ in a manner to cancel the interference component $wo \times L\sigma$ between the current signals $i1\alpha$ and $i1\beta$ and the interference component $wo \times L1$ between the voltage signals $v1\alpha$ and $v1\beta$.

The motor-flux and motor-torque command voltage signals $v1\alpha^*$ and $v1\beta^*$ are applied to the coordinate converter 42 which utilizes the angular frequency signal wo for converting the motor-flux and motor-torque command voltage signals $v1\alpha^*$ and $v1\beta^*$ to three-phase excitation voltage command signals $va^*$, $vb^*$ and $vc^*$. The three-phase excitation voltage command signals $va^*$, $vb^*$ and $vc^*$ are applied to the PWM/INV unit 10 which thereby varies the power to the induction motor IM according to the excitation voltage command signals.

The principle on which the conventional vector control apparatus are based will be described. An induction motor voltage equation expressed in a two-dimentional coordinate system (d, q) fixed with respect to the stator of the induction motor is given as:

$$\begin{bmatrix} v_{1d} \\ v_{1q} \\ 0 \\ 0 \end{bmatrix} = \begin{bmatrix} r_1 + PL_\sigma & 0 & P \cdot M/L_2 & 0 \\ 0 & r_1 + PL_\sigma & 0 & P \cdot M/L_2 \\ -Mr_2/L_2 & 0 & P + r_2/L_2 & \omega_r \\ 0 & -Mr_2/L_2 & -\omega_r & P + r_2/L_2 \end{bmatrix} \begin{bmatrix} i_d \\ i_q \\ \lambda_{2d} \\ \lambda_{2q} \end{bmatrix} \quad (4)$$

where vid is the d-axis primary voltage, v1q is the q-axis primary voltage, i1d is the d-axis primary voltage, i1q is the q-axis primary current, $\lambda 2d$ is the d-axis secondary flux, $\lambda 2q$ is the q-axis secondary flux, wr is the angular velocity of the rotor of the motor, P is the differntiating operator, r1 is the primary resistance, r2 is the secondary resistance, L1 is the primary inductance, L2 is the secondary inductance, M is the excitation inductance, and $L\sigma$ is the equivalent leakage inductance.

Equation (4) can be modified into Equation (5) expressed in another two-dimentional coordinate system $(\alpha, \beta)$ rotating at the same angular velocity as the angular velocity wo of the rotor of the induction motor as:

$$\begin{bmatrix} v_{1\alpha} \\ v_{1\beta} \\ 0 \\ 0 \end{bmatrix} = \begin{bmatrix} r_1 + PL_\sigma & -\omega_o L_\sigma & P \cdot M/L_2 & -\omega_o M/L_2 \\ \omega_o L_\sigma & r_1 + PL_\sigma & \omega_o M/L_2 & P \cdot M/L_2 \\ -Mr_2/L_2 & 0 & P + r_2/L_2 & -(\omega_o - \omega_r) \\ 0 & -Mr_2/L_2 & \omega_o - \omega_r & P + r_2/L_2 \end{bmatrix} \begin{bmatrix} i_{1\alpha} \\ i_{1\beta} \\ \lambda_{2\alpha} \\ \lambda_{2\beta} \end{bmatrix} \quad (5)$$

where $v1\alpha$ is the $\alpha$-axis primary voltage, $v1\beta$ is the $\beta$-axis primary voltage, $i1\alpha$ is the $\alpha$-axis primary current, $i1\beta$ is the $\beta$-axis primary current, $\lambda 2\alpha$ is the $\alpha$-axis secondary flux, and $\lambda 2\beta$ is the $\beta$-axis secondary flux.

Assuming now that the two conditions are fulfilled in Equation (5), that is, when $wo - wr = ws$ where ws is the slip frequency expressed as $ws = (i1\beta/i1\alpha) \times (1/t2)$ and t2 is the secondary time constant given as $t2 = L2/r2$, and when the $\alpha$-axis primary current $i1\alpha$ is constant, good induction motor vector control is achieved where no interference exists between the secondary flux and the secondary current. In the presence of the two conditions, the $\alpha$-axis secondary flux $\lambda 2\alpha$ and the $\beta$-axis secondary flux $\lambda 2\beta$ are expressed as:

$$\lambda 2\alpha = M \times i1\alpha \quad (6)$$

$$\lambda 2\beta = 0 \quad (7)$$

and the motor torque T is expressed as:

$$T = (M/L2) \times (\lambda 2\alpha \times i1\beta - \lambda 2\beta \times i1\alpha) = (M^2/L2) \times i1\alpha \times i1\beta \quad (8)$$

In order to satisfy the two conditions for induction motor vector control, the conventional vector control apparatus require a suitable means for measuring the angular velocity wr of the rotor of the induction motor in order to satisfy the conditions for vector control.

According to the invention, the angular velocity wr of the rotor of the induction motor is estimated as:

$$wx = ki \times \lambda 2\beta + km \times \int \lambda 2\beta dt \quad (9)$$

where ki and km are constant. The estimated value wx for the angular velocity of the rotor of the induction motor is used to satisfy Equations (6) and (7). The principle of the invention will be described in greater detail.

The $\beta$-axis secondary flux $\lambda 2\beta$ used in Equation (9) is calculated from the first and second lines to Equation (4) as:

$$P \times \lambda 2d = (L2/M) \times \{V1d - (r1 \times i1d + L\sigma \times P \times i1d)\}$$

$$P \times \lambda 2d = (L2/M) \times \{V1q - (r1 \times i1q + L\sigma \times P \times i1q)\}$$

Thus, $$\lambda 2d = (L2/M) \times \{\int (v1d - r1 \times i1d)dt - L\sigma \times i1d\} \quad (10)$$

$$\lambda 2q = (L2/M) \times \{\int (v1q - r1 \times i1q)dt - L\sigma \times i1q\} \quad (11)$$

The $\alpha$-axis secondary flux $\lambda 2\alpha$ and the $\beta$-axis secondary flux $\lambda 2\beta$ are obtained by coordinate conversion from the fixed coordinate system (d, q) to the rotating coordinate system ($\alpha$, $\beta$) as:

$$\begin{bmatrix} \lambda 2\alpha \\ \lambda 2\beta \end{bmatrix} = \begin{bmatrix} \cos\theta & \sin\theta \\ -\sin\theta & \cos\theta \end{bmatrix} \begin{bmatrix} \lambda 2d \\ \lambda 2q \end{bmatrix} \quad (12)$$

where $\theta = \int wo\, dt$. It is apparent from Equations (10), (11) and (12) that the $\beta$-axis secondary flux is determined by the d-axis primary voltage v1d, the q-axis primary voltage v1q, the d-axis primary current i1d, and the q-axis primary current. Accordingly, the angular velocity wr of the rotor of the induction motor can be estimated from the primary current and voltage without the use of any means for sensing the rotor angular velocity wr. In order to provide accurate vector control according to the invention, it is preferable that the secondary flux $\lambda 2$ be maintained constant. The reason for this will be described in connection with FIGS. 4 and 5.

FIG. 4 contains three graphs showing motor characteristics provided when the motor is operating under the CCS type vector control. These graphs are obtained by varying the second resistance r2 while maintaining the motor-flux and motor-torque command current signals i1$\alpha$* and i1$\beta$* constant. As can be seen by a study of FIG. 4, the secondary flux $|\lambda 2|$ remains constant substantially independently of the secondary resistance, whereas the motor primary current i1 and the motor torque T decrease with increasing secondary resistance.

FIG. 5 contains three graphs showing motor characteristics provided when the motor is operating under the CVS type vector control. These graphs are obtained by varying the second resistance while maintaining the motor-flux and motor-torque command current signals i1$\alpha$* and i1$\beta$* constant. As can be seen by the reference to FIG. 5, the secondary flux $|\lambda 2|$ and the motor torque T increase with increasing secondary resistance, whereas the motor primary current i1 remains constant substantially independently of the secondary resistance.

If the secondary resistance value used in calculating the slip factor is different from the actual secondary resistance, an error will be introduced into the calculated slip frequency, resulting in an inaccurate motor vector control. With vector control of the CCS type where the secondary flux varies with variations in secondary resistance, it is difficult, if not possible, to provide a stable motor angular velocity estimation without a suitable means for controlling the secondary flux $|\lambda 2|$ constant. For this reason, it is preferable that the invention be applied to vector control of the CVS type where the secondary flux $|\lambda 2|$ is held constant independently of the secondary resistance.

Figure 6:
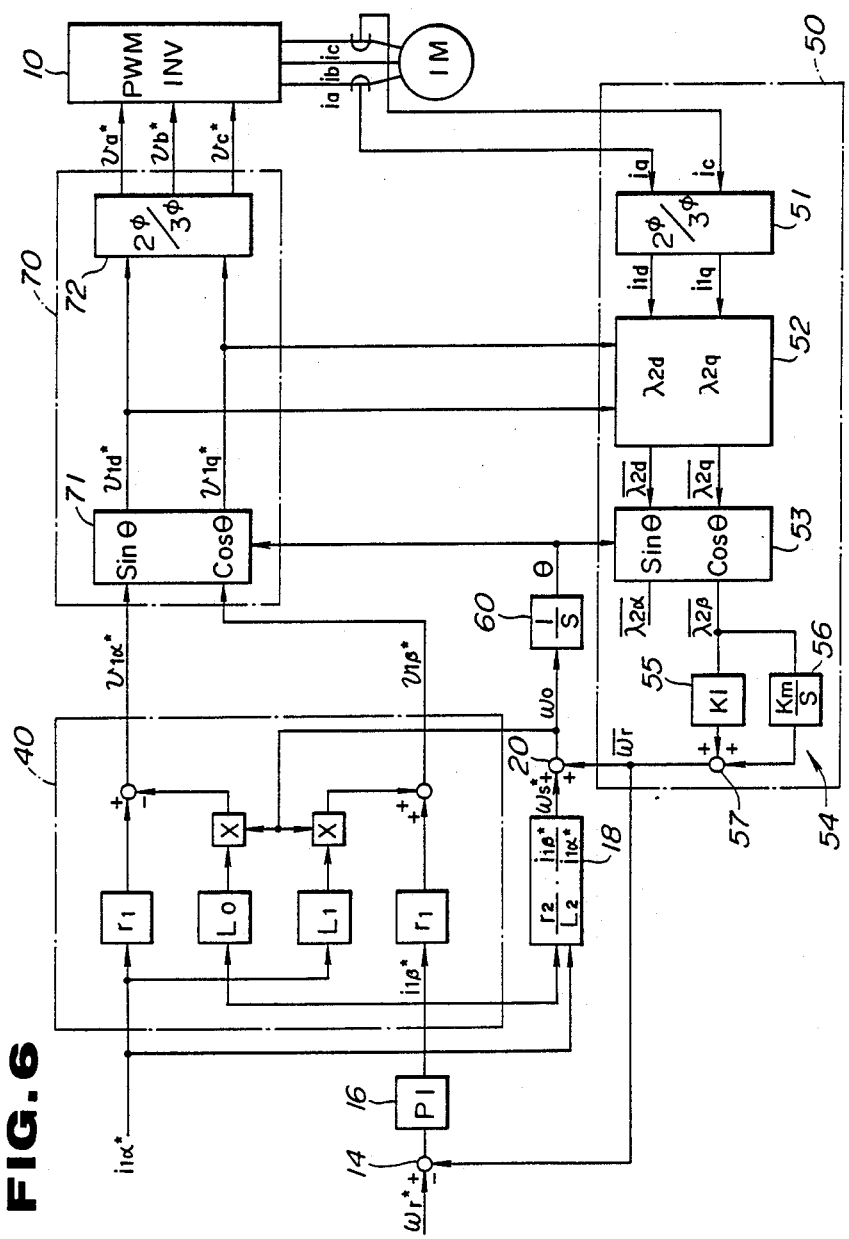
FIG. 6 is a schematic block diagram showing an induction motor vector control apparatus embodying the method and apparatus of the invention.

Referring to FIG. 6, there is illustrated a CVS type vector control apparatus embodying the method and apparatus of the invention. The vector control apparatus includes an angular velocity estimation circuit, generally designated by the numeral 50, for estimating the angular velocity of the rotor of the induction motor IM. The estimation circuit 50 produces an extimated speed signal $\overline{wr}$ indicative of an estimated value of the angular velocity wr.

The estimated speed signal $\overline{wr}$ is applied to a subtractor 14 having another input from a current source which produces a speed command signal wr* indicative of a required value for motor speed. The subtractor 14 subtracts the estimated speed signal $\overline{wr}$ from the speed command signal wr* to provide a speed error signal indicative of the difference between the estimated-speed and speed-command signals $\overline{wr}$ and wr*. The speed error signal is fed from the subtractor 14 to a proportional-plus-integral control circuit 16 which converts the speed error signal to a motor-torque command current signal i1$\beta$* indicative of a required value for motor torque expressed in the rotating coordinate system. The motor-torque command current signal i1$\beta$* is fed to a slip calculation circuit 18 having another input from a current source which produces a motor-flux command current signal i1$\alpha$* indicative of a required value for motor flux expressed in the rotating coordinate system.

The slip calculation circuit 18 calculates a value ws for slip frequency as $ws = i1\beta*/(i1\alpha* \times t2)$, where t2 is a secondary time constant given as $t2 = r2/L2$. The slip calculation circuit 18 produces a slip frequency signal ws indicative of the calculated slip frequency value. The slip frequency signal ws is fed to a summing circuit 20 which adds it to the estimated speed signal $\overline{wr}$ fed thereto from the angular velocity estimation circuit 50 and produces an angular frequency signal wo indicative of a primary angular frequency. The angular frequency signal wo is applied to an integrating circuit 60 which integrates the angular frequency signal wo to produce an estimated angular position signal $\theta$ indicative of the estimated value of the angular position of the secondary flux.

The angular frequency signal wo is also applied to a non-reference calculation circuit 40. The non-interference calculation circuit 40 converts the motor-flux and motor-torque command current signals i1$\alpha$* and i1$\beta$* to motor-flux and motor-torque command voltage signals v1$\alpha$* and v1$\beta$* by calculating required values for the voltage signals v1$\alpha$* and v1$\beta$* from Equations (1) and (3). As described previously, the non-interference calculation circuit 40 calculates the motor-flux and motor-torque command voltage signals v1$\alpha$* and v1$\beta$* in a manner to cancel the interference component wo$\times$L$\sigma$ between the current signals i1$\alpha$ and i1$\beta$ and the interference component wo$\times$L1 between the voltage signals v1$\alpha$ and v1$\beta$.

The motor-flux and motor-torque command voltage signals v1$\alpha$* and v1$\beta$* are applied to a converter 70 which utilizes the angular position signal $\theta$ for converting the motor-flux and motor-torque command voltage signals v1$\alpha$* and v1$\beta$* to three-phase excitation voltage command signals va*, vb* and vc*. For this purpose, the converter 70 includes a coordinate converter 71 and a 2-phase/3-phase converter 72.

The coordinate converter 71 utilizes the angular position signal $\theta$ to convert the motor-flux and motor-torque command current signals $i1\alpha^*$ and $i1\beta^*$ expressed in the rotating coordinate system ($\alpha, \beta$) to motor-flux and motor-torque command voltage signals $v1d^*$ and $v1q^*$ expressed in the fixed coordinate system (d, q). This conversion is made according to the following conversion equation:

$$\begin{bmatrix} v_{1d}^* \\ v_{1q}^* \end{bmatrix} = \begin{bmatrix} \cos\theta & -\sin\theta \\ \sin\theta & \cos\theta \end{bmatrix} \begin{bmatrix} v_{1\alpha}^* \\ v_{1\beta}^* \end{bmatrix}$$

where $\theta = \int w o' dt$. The converted command voltage signals $v1d^*$ and $v1q^*$ are applied to the 2-phase/3-phase converter 72 which converts them to three-phase excitation voltage command signals $va^*$, $vb^*$ and $vc^*$. This conversion is made according to the following conversion equation:

$$\begin{bmatrix} v_a^* \\ v_b^* \\ v_c^* \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} v_{1d}^* \\ v_{1q}^* \end{bmatrix}$$

The excitation voltage command signals $va^*$, $vb^*$ and $vc^*$ are applied to a PWM/INV unit 10 which varies the power to the induction motor IM according to these inputs.

The angular velocity estimation circuit 50 includes a converter 51 having inputs from two current transformers. The first current transformer is coupled to one of the three-phase output conductors for providing an exitation current feedback signal indicative of the a-phase excitation current ia. The second current transformer is coupled to another output conductor for providing an excitation current feedback signal indicative of the c-phase excitation current ic. The converter 51 measures the b-phase excitation current ib based on these excitation current feedback signals and produces primary current signals i1d and i1q indicative of the d- and q-axis primary current values expressed in the fixed coordinate system (d, q). For this purpose, the converter 51 calculates the d- and q-axis primary current values from the following equation:

$$\begin{bmatrix} i_{1d} \\ i_{1q} \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_a \\ i_b \\ i_c \end{bmatrix}$$

The primary current signals i1d and i1q are fed to a secondary flux calculation circuit 52. This calculation circuit also receives the command voltage signals $v1d^*$ and $v1q^*$ from the coordinate converter 71. The command voltage signals $v1d^*$ and $v1q^*$ are used in place of measurements of the actual primary voltage values since the PWM/INV unit 10 has a property of producing sine wave output voltages correctly as commanded by the command voltage signals $v1d^*$ and $v1q^*$. The secondary flux calculation circuit 52 estimates d- and q-axis secondary flux values $\overline{\lambda 2d}$ and $\overline{\lambda 2q}$ from Equation (10) and (11) and produces estimated secondary flux signals $\overline{\lambda 2d}$ and $\overline{\lambda 2q}$ indicative of the estimated d- and q-axis secondary flux values to a coordinate converter 53. The coordinate converter 53 utilizes the angular position signal $\theta$ to convert the estimated secondary flux signals $\overline{\lambda 2d}$ and $\overline{\lambda 2q}$ to estimated secondary flux signals $\overline{\lambda 2\alpha}$ and $\overline{\lambda 2\beta}$ expressed in the rotating coordinate system ($\alpha, \beta$). This conversion is made according to Equation (12).

The estimated secondary flux signal $2\beta$ indicative of the estimated $\beta$-axis secondary flux is applied to a calculation circuit generally designated by the numeral 54. The calculation circuit 54 calculates an estimated value $\overline{wr}$ for the angular velocity wr of the rotor of the induction motor IM. This calculation is made as a function of estimated $\beta$-axis secondary flux $\overline{\lambda 2\beta}$ from Equation (9). For this purpose, the calculation circuit 54 includes a proportional amplifier 55 and an integrating amplifier 56. The proportional amplifier 55 recives the estimated $\beta$-axis secondary flux signal $\overline{\lambda 2\beta}$ and produces an output siganl having a mugnitude ($ki \times \overline{\lambda 2\beta}$) proportional to the magnitude of the estimated $\beta$-axis secondary flux signal $\overline{\lambda 2\beta}$. The integrating amplifier 56 receives the estimated $\beta$-axis secondary flux signal $\overline{\lambda 2\beta}$ and produces an output signal having a magnitude ($Km \times \overline{\lambda 2\beta}$) proportional to the integral of the magnitude of the estimated $\beta$-axis secondary flux signal $\overline{\lambda 2\beta}$. The signals outputted from the amplifying circuits 55 and 56 are fed to a summing circuit 57 where they are added to produce the estimated speed signal $\overline{wr}$ indicative of the estimated angular velocity of the rotor of the induction motor IM.

According to this invention, an actual value for induction motor angular velocity is estimated as a function of primary current and voltage applied to drive the induction motor. It is, therefore, possible to eliminate the need for a tachometer generator or other speed sensors used in measuring the existing induction motor angular velocity.

While this invention has been described in conjunction with a specific embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. A method for vector control of an adjustable-speed induction motor having a secondary resistance, a secondary inductance, and a secondary time constant generally equal to the secondary resistance divided by the secondary inductance, and including means for applying a primary current and voltage to drive the induction motor, comprising the steps of:
   setting a desired motor torque;
   setting a desired motor flux;
   calculating a slip frequency based on the desired motor torque, the desired motor flux, and the secondary time constant;
   sensing the primary current and voltage;
   estimating a value for induction motor angular velocity as a function of the sensed primary current and voltage;
   summing the calculated slip frequency to the estimated angular velocity to calculate an angular frequency; and
   controlling the motor driving means based on the desired motor torque, the desired motor flux, and the calculated angular frequency to vary the primary current and voltage so as to drive the induction motor with no $\beta$-axis secondary flux.

2. The method as claimed in claim 1, wherein the angular velocity estimating step includes the steps of estimating a value $\lambda 2\beta$ for the $\beta$-axis secondary flux as a function of the primary current and voltage, and calculating the estimated angular velocity value wx as:

$$wx = ki \times \lambda 2\beta + Km \times \int \lambda 2\beta dt$$

where ki is a constant and km is a constant.

3. The method as claimed in claim 2, wherein the desired motor torque setting step includes the steps of setting a desired motor angular velocity value, calculating an error between the desired and estimated motor angular velocity values, and calculating a desired value for motor torque as a function of the calculated error.

4. The method as claimed in claim 2, wherein the induction motor has a primary resistance r1, a primary inductance L1, and an equivalent leakage inductance L$\sigma$, and wherein the step of controlling the motor driving means includes the steps of:
calculating values $v1\alpha^*$ and $v1\beta^*$ for motor-flux and motor-torque command voltages as:

$$v1\alpha^* = r1 \times i1\alpha^* + wo \times L\sigma \times i1\beta^*$$

$$v1\beta^* = r1 \times i1\beta^* - wo \times L1 \times i1\alpha^*$$

where $1i\alpha^*$ is the desired motor flux, $i1\beta^*$ is the desired motor torque, and wo is the calculated angular frequency and
converting the calculated values $v1\alpha^*$ and $v1\beta^*$ to 3-phase excitation voltages to drive the induction motor.

5. The method as claimed in claim 4, wherein the step of converting the calculated values $v1\alpha^*$ and $v1\beta^*$ includes the steps of:
converting the calculated values $v1\alpha^*$ and $v1\beta^*$ to motor-flux and motor-torque command voltage values $v1d^*$ and $v1q^*$; and
converting the calculated values $v1d^*$ and $v1q^*$ to the 3-phase excitation voltages.

6. The method as claimed in claim 5, wherein the induction motor has an excitation inductance M and a secondary inductance L2, and wherein the step of calculating the estimated angular velocity value wx includes the steps of:
calculating d- and q-axis primary current values ild and ilq as a function of primary currents to the induction motor;
calculating p- and q-axis secondary flux values $\lambda 2d$ and $\lambda 2q$ as:

$$\lambda 2d = (L2/M) \times \{\int(v1d^* - r1 \times i1d)dt - L\sigma \times i1d\}$$

$$\lambda 2q = (L2/M) \times \{\int(v1q^* - r1 \times i1q)dt - L\sigma \times i1q\}$$

and
converting the calculated values $\lambda 2d$ and $\lambda 2q$ to the $\beta$-axis secondary flux value $\lambda 2\beta$ using the calculated angular frequency.

7. An apparatus for vector control of an adjustable-speed induction motor having a secondary resistance, a secondary inductance, and a secondary time constant generally equal to the secondary resistance divided by the secondary inductance, and including means for applying a primary current and voltage to drive the induction motor, comprising:
a first source for producing a torque command signal indicative of a desired motor torque;
a second source for producing a flux command signal indicative of a desired motor flux;
means for calculating a slip frequency based on the torque command signal, the flux command signal, and the secondary time constant to produce a slip frequency signal indicative of the calculated slip frequency;
sensor means for sensing the primary current and voltage;
means coupled to the sensor means for estimating a value for induction motor angular velocity as a function of the sensed primary current and voltage to produce an estimated speed signal indicative of the estimated motor angular velocity;
means for summing the slip frequency signal to the estimated speed signal to provide an angular frequency signal; and
a control circuit responsive to the torque command signal, the flux command signal, and the angular frequency signal for controlling the motor driving means to vary the primary current and voltage so as to drive the induction motor with no $\beta$-axis secondary flux.

8. The apparatus as claimed in claim 7, wherein the angular velocity estimating means including a circuit for estimating a value $\lambda 2\beta$ for the $\beta$-axis secondary flux as a function of the primary current and voltage, and means for calculating the estimated angular velocity value wx as:

$$wx = Ki \times \lambda 2\beta + Km \times \int \lambda 2\beta dt$$

where ki is a constant and km is a constant.

9. The apparatus as claimed in claim 8, wherein the first source includes means for producing a speed command signal indicative of a desired motor speed, means for calculating a difference between the speed command signal and the estimated speed signal to produce a speed error signal indicative of the calculated difference, and a proportional-plus-integral circuit receiving the speed error signal for converting the speed error signal to the torque command signal.

10. The apparatus as claimed in claim 8, wherein the induction motor has a primary resistance r1, a primary inductance L1, and an equivalent leakage inductance L$\sigma$, and wherein the control circuit includes means for calculating values $v1\alpha^*$ and $v1\beta^*$ for motor-flux and motor-torque command voltages as:

$$v1\alpha^* = r1 \times i1\alpha^* + wo \times L \times i1\beta^*$$

$$v1\beta^* = r1 \times i1\beta^* - wo \times L1 \times i1\alpha^*$$

where $1i\alpha^*$ is the desired motor flux, $i1\beta^*$ is the desired motor torque, and wo is the calculated angular frequency and means for converting the calculated values $v1\alpha^*$ and $v1\beta^*$ to 3-phase excitation voltages to drive the induction motor.

11. The apparatus as claimed in claim 10, wherein the means for converting the calculated values $v1\alpha^*$ and $v1\beta^*$ includes means for converting the calculated values $v1\alpha^*$ and $v1\beta^*$ to motor-flux and motor-torque command voltage values $v1d^*$ and $v1q^*$ and means for converting the calculated values v1d* and v1q* to the 3-phase excitation voltages.

12. The apparatus as claimed in claim 11, wherein the induction motor has an excitation inductance M and a secondary inductance L2, and wherein the means for calculating the estimated angular velocity value wx includes means for calculating d- and q-axis primary current values i1d and i1q as a function of primary currents to the induction motor, means for calculating p- and q-axis secondary flux values λ2d and λ2q as:

$$\lambda 2d = (L2/M) \times \{\int (v1d^* - r1 \times i1d)dt - L\sigma \times i1d\}$$

$$\lambda 2q = (L2/M) \times \{\int (v1q^* - r1 \times i1q)dt - L\sigma \times i1q\}$$

and means responsive to the angular frequency signal for converting the calculated values λ2d and λ2q to the β-axis secondary flux value λ2β.

* * * * *